(12) United States Patent
Jiang

(10) Patent No.: US 12,010,356 B2
(45) Date of Patent: Jun. 11, 2024

(54) METHOD AND APPARATUS FOR SENDING INFORMATION IN LIVE BROADCAST ROOM, AND ELECTRONIC DEVICE

(71) Applicant: BEIJING BYTEDANCE NETWORK TECHNOLOGY CO., LTD., Beijing (CN)

(72) Inventor: Zerui Jiang, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 93 days.

(21) Appl. No.: 17/774,812

(22) PCT Filed: Nov. 2, 2020

(86) PCT No.: PCT/CN2020/125954
§ 371 (c)(1),
(2) Date: May 5, 2022

(87) PCT Pub. No.: WO2021/088772
PCT Pub. Date: May 14, 2021

(65) Prior Publication Data
US 2022/0408121 A1    Dec. 22, 2022

(30) Foreign Application Priority Data
Nov. 5, 2019   (CN) .......................... 201911070808.6

(51) Int. Cl.
*H04N 7/173*     (2011.01)
*H04N 21/2187*   (2011.01)
(Continued)

(52) U.S. Cl.
CPC ..... *H04N 21/2187* (2013.01); *H04N 21/2393* (2013.01); *H04N 21/25891* (2013.01)

(58) Field of Classification Search
CPC ........... H04N 21/2187; H04N 21/2393; H04N 21/25891; H04N 21/2668; H04N 21/2743
See application file for complete search history.

(56) References Cited

U.S. PATENT DOCUMENTS

2005/0240600 A1*  10/2005  Hill .................... G06Q 30/02
2019/0044899 A1*   2/2019  Hughes ................ H04L 51/066
(Continued)

FOREIGN PATENT DOCUMENTS

CN    105872574 A    8/2016
CN    106375799 A    2/2017
(Continued)

OTHER PUBLICATIONS

Sha Qin, A Live Broadcast Method, Device, Electronic Device And Computer Readable Storage Medium, Sep. 30, 2017 (translation version) (Year: 2017).*
(Continued)

*Primary Examiner* — Gigi L Dubasky
(74) *Attorney, Agent, or Firm* — BakerHostetler

(57) ABSTRACT

Embodiments of the present application provide a method and an apparatus for sending information in a live broadcast room, and an electronic device, the method includes: receiving a service request sent by a user in a current room; formulating or selecting a screening condition for screening a target room by a configuration center according to service requirements; acquiring the screening condition and screening the target room according to the screening condition; and sending the service request to the target room so as to complete sending information in the live broadcast room.

18 Claims, 4 Drawing Sheets

(51) Int. Cl.
      *H04N 21/239*    (2011.01)
      *H04N 21/258*    (2011.01)

(56) References Cited

U.S. PATENT DOCUMENTS

| | | | |
|---|---|---|---|
| 2022/0230227 A1* | 7/2022 | Fan | G06Q 10/02 |
| 2022/0239760 A1* | 7/2022 | Jia | H04L 12/1859 |

FOREIGN PATENT DOCUMENTS

| | | | |
|---|---|---|---|
| CN | 106452805 A | 2/2017 | |
| CN | 107302489 A | 10/2017 | |
| CN | 107341106 A | 11/2017 | |
| CN | 109831698 A | 5/2019 | |
| CN | 110297707 A | 10/2019 | |
| CN | 110300311 A | 10/2019 | |
| CN | 110300335 A | 10/2019 | |
| CN | 110377654 A | 10/2019 | |
| CN | 110996141 A | 4/2020 | |
| JP | 2003-284027 A | 10/2003 | |
| WO | WO 2018/213481 A1 | 11/2018 | |

OTHER PUBLICATIONS

International Patent Application No. PCT/CN2020/125954; Int'l Search Report; dated Jan. 19, 2021; 3 pages.

\* cited by examiner

METHOD AND APPARATUS FOR SENDING INFORMATION IN LIVE BROADCAST ROOM, AND ELECTRONIC DEVICE

This application is the national phase application of PCT International Patent Application No. PCT/CN2020/125954, filed on Nov. 2, 2020, which claims priority of the Chinese patent application entitled "Method and Apparatus for Sending Information in Live Broadcast Room, and Electronic Device" filed to the Patent Office of China on Nov. 5, 2019, with the Application No. 201911070808.6, the disclosure of which is incorporated herein by reference in their entireties.

TECHNICAL FIELD

The present application relates to a technical field of information processing, and more particularly, to a method and an apparatus for sending information in a live broadcast room, and an electronic device.

BACKGROUND

Application of live broadcast technology in computers and the Internet is becoming more and more extensive, for example, in live video broadcast, a host opens a room in an application (APP) having a live video function for live broadcast, and other users may enter the host's live broadcast room to watch, interacts with the host, and interacts with corresponding users in other live broadcast rooms through a server, and so on.

However, in the prior art, there are still certain problems in sending live broadcast information, for example, some rooms cannot receive broadcast information during broadcasting, etc., so a better method for broadcasting information is required.

SUMMARY

A purpose of the present application is to provide a method and an apparatus for sending information in a live broadcast room, and an electronic device, in order to solve the problem in the prior art that a large number of other information related to the screening condition in a full-service broadcast server needs to be changed when configuring a new screening condition.

In the first aspect, the embodiment of the present application provides a method for sending information in a live broadcast room, comprising:
  receiving a service request sent by a user in a current room; formulating or selecting a screening condition for screening a target room by a configuration center according to service requirements; acquiring the screening condition and screening the target room according to the screening condition; and sending the service request to the target room so as to complete sending information in the live broadcast room.

Optionally, after formulating or selecting the screening condition for screening the target room by the configuration center, the method further comprises: storing the screening condition so as to acquire the screening condition.

Optionally, formulating or selecting the screening condition for screening the target room by the configuration center comprises: comparing a formulated new screening condition with an existing screening condition in the configuration center, and judging whether the existing screening condition in the configuration center comprises the formulated new screening condition; in the case where the existing screening condition in the configuration center comprises the formulated new screening condition, selecting a screening condition that is same as the formulated new screening condition in the existing screening condition in the configuration center as the formulated new screening condition; otherwise, formulating a new screening condition in the configuration center.

Optionally, acquiring the screening condition and screening the target room according to the screening condition comprises: acquiring the screening condition; acquiring unique identifiers of online rooms; acquiring room information of the online rooms according to the unique identifiers of the online rooms; and according to the screening condition that is acquired and the room information of the online rooms, screening the target room from the online rooms that are acquired.

Optionally, acquiring the screening condition and screening the target room according to the screening condition comprises: acquiring the screening condition; loading the screening condition in a goroutine of a main thread; acquiring the unique identifiers of the online rooms and grouping the unique identifiers of the online rooms; processing the online rooms that are grouped by using the goroutine to screen out the target room.

Optionally, processing the online rooms that are grouped by using the goroutine to screen out the target room comprises: by using a plurality of goroutines, according to the unique identifiers of the online rooms in each group, acquiring room information of the online rooms in the group; the goroutines being in a one-to-one correspondence with the groups of the unique identifiers of the online room; and by using the goroutine, screening out the target room from the online rooms in each group according to the screening condition loaded in the goroutine and the room information of the online rooms in each group that is acquired.

Optionally, receiving the service request sent by the user in the current room comprises: receiving the service request corresponding to an application programming interface sent by the user through the application programming interface in the current room; converting data corresponding to the service request corresponding to the application programming interface through the application programming interface to obtain data in a preset format; writing the data in the preset format into a message queue; and reading the data in the preset format in the message queue, to complete receiving the service request sent by the user in the current room, so as to send the service request to the target room.

In the second aspect, the embodiment of the present application provides an apparatus for sending information in a live broadcast room, the apparatus comprises:
  a receiving module, configured to receive a service request sent by a user in a current room;
  a configuration center module, configured to formulate or select a screening condition for screening a target room by a configuration center according to service requirements;
  a screening module, configured to acquire the screening condition and screen the target room according to the screening condition; and
  a sending module, configured to send the service request to the target room so as to complete sending information in the live broadcast room.

Optionally, after formulating or selecting the screening condition for screening the target room by the configuration center, the configuration center module is further used to store the screening condition to acquire the screening condition.

Optionally, the configuration center module is used to: compare a formulated new screening condition with an existing screening condition in the configuration center, and judge whether the existing screening condition in the configuration center comprises the formulated new screening condition; in the case where the existing screening condition in the configuration center comprises the formulated new screening condition, select a screening condition that is same as the formulated new screening condition in the existing screening condition in the configuration center as the formulated new screening condition; otherwise, formulate a new screening condition in the configuration center.

Optionally, the screening module is used to: acquire the screening condition; acquire unique identifiers of the online rooms; acquire room information of the online rooms according to the unique identifiers of the online rooms; and according to the screening condition that is acquired and the room information of the online rooms, screen the target room from the online rooms that are acquired.

Optionally, the screening module is used to: acquire the screening condition; load the screening condition in a goroutine of a main thread; acquire the unique identifiers of the online rooms, and group the unique identifiers of the online rooms; and process the online rooms that are grouped by using the goroutine to screen out the target room.

Optionally, in the case where processing the online rooms that are grouped by using the goroutine to screen out the target room, the screening module is used to: by using a plurality of goroutines, according to unique identifiers of the online rooms in each group, acquire room information of the online rooms in the group; the goroutines being in a one-to-one correspondence with groups of the unique identifiers of the online rooms; and by using the goroutine, screen out the target room from the online rooms in each group according to the screening condition loaded in the goroutine and the room information of the online rooms in each group that is acquired.

Optionally, the receiving module is used to: receive the service request corresponding to an application programming interface sent by the user through the application programming interface in the current room; convert data corresponding to the service request corresponding to the application programming interface through the application programming interface to obtain data in a preset format; write the data in the preset format into a message queue; and read the data in the preset format in the message queue, to complete receiving the service request sent by the user in the current room, so as to send the service request to the target room.

In the third aspect, the embodiment of the present application further provides an electronic device, the electronic device comprises:

at least one processor; and a memory in communicative connection with the at least one processor; wherein, the memory stores instructions executable by the at least one processor, and the instructions are executed by the at least one processor so that the at least one processor can execute the method for sending information in the live broadcast room in the forgoing first aspect or any implementation of the first aspect.

In the fourth aspect, the embodiment of the present application further provides a computer-readable storage medium, the computer-readable storage medium stores instructions, and the instructions are used to cause the computer to execute the method for sending information in the live broadcast room in the foregoing first aspect or any implementation of the first aspect.

In the fifth aspect, the embodiment of the present application further comprises a computer program product, the computer program product comprises program codes, and in the case where the program codes are run by a computer, the program codes cause the computer to execute the method for sending information in the live broadcast room in the foregoing first aspect or any implementation of the first aspect.

In the method and the apparatus for sending information in a live broadcast room, and the electronic device according to the embodiments of the present application, by formulating or selecting a screening condition for screening a target room in a configuration center, in the case where the screening condition is changed according to service requirements, it is only necessary to formulate or select by the configuration center without a large number of changes to other relevant configuration information in the system, which avoids the problems of heavy modification tasks and system instability caused by modifying a large amount of other relevant information of the system when modifying the screening condition in the prior art, thereby improving work efficiency and system stability.

BRIEF DESCRIPTION OF THE DRAWINGS

In order to illustrate the technical solutions of the embodiments of the present application more clearly, the following briefly introduces the drawings that are used in the embodiments. Obviously, the drawings in the following description are only some embodiments of the present application. For those of ordinary skill in the art, other drawings can also be obtained from these drawings without any creative effort.

DETAILED DESCRIPTION

Figure 1:
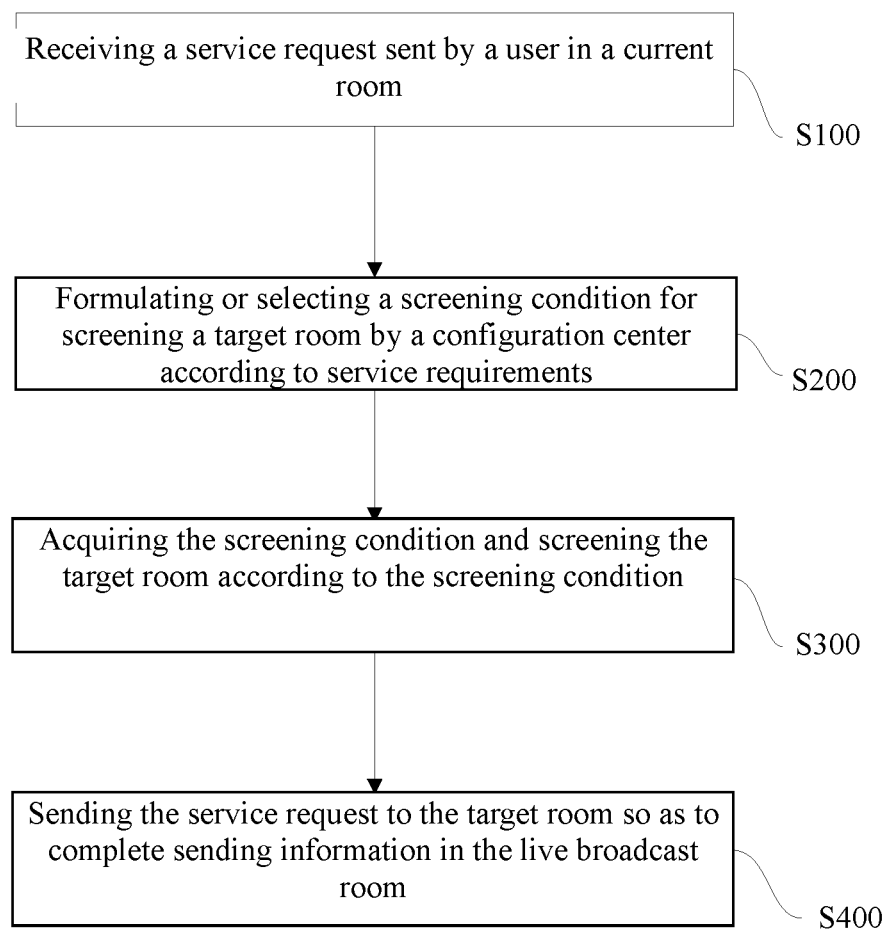
FIG. 1 is a schematic flow chart of a method for sending information in a live broadcast room provided by an embodiment of the present application.

The embodiments of the present application will be described in detail below in conjunction with the accompanying drawings.

The embodiments of the present application are described below through specific examples, and those skilled in the art may easily understand other advantages and effects of the present application from the contents disclosed in this specification. Obviously, the described embodiments are only part of the embodiments of the present application, but not all of the embodiments. The present application may also be implemented or applied through other different specific embodiments, and various details in this specification may also be modified or changed based on different viewpoints and applications without departing from the spirit of the present application. It should be noted that, the embodiments and features in the embodiments below may be combined with each other under the condition of no conflict. Based on the embodiments of the present application, all other embodiments obtained by those of ordinary skill in the art without any inventive work fall within the protection scope of the present disclosure.

It should be noted that, various aspects of embodiments within the scope of the appended claims are described below. It should be apparent that, the aspects described herein may be embodied in a wide variety of forms and that any specific structure and/or function described herein is exemplary only. Based on the present application, those skilled in the art should appreciate that, an aspect described herein may be implemented independently of any other aspects and that two or more of these aspects may be combined in various ways. For example, a device may be implemented and/or a method may be practiced by using any number of the aspects set forth herein. Additionally, such a device may be implemented and/or such a method may be practiced by using other structure and/or functionality in addition to the one or more of the aspects set forth herein.

It should also be noted that, the accompanying drawings provided in the embodiments below only illustrate a basic conception of the present application in a schematic way, and the drawings only show the components related to the present application instead of drawing according the number, shape and size of the components in actual implementation. Type, quantity, and proportion of each component may be arbitrarily changed during its actual implementation, and its component layout may also be more complicated.

Additionally, in the description below, specific details are provided to facilitate thorough understanding of the examples. However, those skilled in the art will understand that aspects may be practiced without these specific details.

An embodiment of the present application provides a method for sending information in a live broadcast room. The method for sending information in a live broadcast room provided in this embodiment may be executed by a computing apparatus; the computing apparatus may be implemented as software, or as a combination of software and hardware; and the computing apparatus may be integrated in a server, a terminal device, etc.

Application of live broadcast technology in computers and the Internet is becoming more and more extensive, for example, in live video, a host opens a room in an application (APP) having a live video function for live broadcast, and other users may enter the host's live broadcast room to watch, interacts with the host, and interacts with corresponding users in other live broadcast rooms through a server, and so on. Taking a certain live broadcast room as an example, the live broadcast room is regarded as a current room; when a service request sent by a user in the current room is subjected to full-service broadcast, a full-service broadcast server receives the service request sent by the user received in the current room, and then according to the service request, pulls a currently online live broadcast room and broadcasts the currently online live broadcast room, that is, broadcasts the service request sent by the user in the current room to the currently online rooms. In the prior art, when a fan who enters the live broadcast room or a user who enters the room for viewing performs an operation, that is, sends a service request, the full-service broadcast server needs to send the service request to the currently online rooms for broadcasting as needed, but needs to screen the currently online rooms, and send the service request to a room that meets a broadcast condition. Therefore, it is necessary to configure screening information or a selection condition in the system, and screen out a final room for broadcasting according to the screening information or the selection condition configured.

However, the screening information or the selection condition configured in the system may only screen out a certain one or the selection range is limited. When a service requirement changes and the screening information or the selection condition configured in the system need to be changed, the system needs to be reconfigured, to reconfigure the screening information or the selection condition in the system. At this time, it is necessary to change a large amount of information in the system if the screening information or the selection condition in the system are to be reconfigured, not just changing the screening information or the selection condition, which is time-consuming and labor-intensive.

Referring to FIG. 1, a method for sending information in a live broadcast room provided by an embodiment of the present application mainly comprises following steps:

Step S100: receiving a service request sent by a user in a current room.

Step S200: formulating or selecting a screening condition for screening a target room by a configuration center according to service requirements.

Step S300: acquiring the screening condition and screening the target room according to the screening condition.

Step S400: sending the service request to the target room so as to complete sending information in the live broadcast room.

Wherein, in step S100, the service request sent by the user in the current room is received. The method of this embodiment may be applied to a live broadcast room. In a scenario of live broadcast in a live broadcast room, a host of a certain live broadcast room opens the live broadcast room thereof, and then performs the method in this embodiment, so as to realize the sending of information in the live broadcast room. The live broadcast room where the host is located may be used as the current room. Of course, any live broadcast room in the live broadcast rooms for online live broadcast may be used as the current room. The service request sent by the user in the current room is sent as a sending object, the user request sent by the user is a request sent by the user that is related to the live broadcast room (i.e., the current room), the service requests sent by the user are all service requests for performing full-service broadcast, and may comprise information sent by a fan of the host of the live broadcast room, information of a certain user entering the live broadcast room, information that the user entering the live broadcast room joins a fan group of the host of the live broadcast room, information that a certain user or a certain fan of the host of the live broadcast room is guarding the host (the term in the live broadcast room may also be referred to as gold master guardian, which may be to send something for the host to accompany the host, etc.), and so on. The information sent by the fan of the host may be information sent by the fan to the host, for example, reward information, gift-giving information, etc. Of course, the service request sent by the user may also comprise other information, and no details will be repeated here.

The service request sent by the user may be a service request sent to the current room through a client of the user, which is sent to the full-service broadcast server through an application program service interface set in the current room, and the full-service broadcast server receives the service request sent by the user client that is received through the application program service interface set in the current room. There are application program interfaces (API interfaces) corresponding to different service requests set in the current room, when a user sends a service request through the user client, an API interface corresponding to the service request receives the service request, and then sends the service request to the full-service broadcast server. For example, when a user sends a service request for gift-giving through the user client, after the user enters the current live broadcast room, the user sends a service request for gift-giving through the client, and the service request is a service request for giving gift to the host of the current room. The service request for gift-giving is sent to the full-service broadcast server through the current room to facilitate full-service broadcast.

The full-service broadcast may be broadcast to all online rooms, broadcast to all rooms, or broadcast to a specified room (e.g., a room that meets certain broadcast conditions). This embodiment is described by taking broadcasting to a specified room as an example.

Of course, the method in this embodiment may also be applicable to other applicable scenarios, which will not be specifically limited here.

Step S200: formulating or selecting a screening condition for screening a target room by a configuration center according to service requirements. The room selected according to the screening condition is referred to as the target room, that is, the room to which the service is finally sent is referred to as the target room. By formulating or selecting the screening condition for screening the target room in the configuration center, the target room is screened according to the screening condition, so as to broadcast the target room. Before formulating or selecting a screening condition for screening a target room by the configuration center, a configuration center needs to be built. The configuration center is equivalent to a micro server, which may be used to configure data and read data. The configuration center in this embodiment may be a web page associated with a live broadcast application, or may also be a configuration item built through an interface inside the live broadcast application, and the interface may be presented in a form of a web page and may configure the screening condition. How to build the configuration center or what kind of configuration center to build, as well as a specific structure or an operation mode of the configuration center are not the focus of this embodiment, and no details will be described here. In this embodiment, a component or a virtual module, etc. may also be regarded as a configuration center, as long as it may implement the same function as the configuration center.

Screening conditions corresponding to different service requirements will be different. According to the service requirements in the actual application, a screening condition for screening the target room is specified or selected by the configuration center. The screening condition that has been formulated is saved in the configuration center. When the screening condition required to be configured is a new screening condition or a screening condition that is not in the configuration center, it is necessary to formulate the screening condition in the configuration center. When the screening condition required to be configured is the screening condition that has been saved in the configuration center, it is only necessary to select the corresponding screening condition from the configuration center as the screening condition required to be configured, without formulating the screening condition by the configuration center again.

After formulating or selecting the screening condition for screening the target room by the configuration center, it further comprises: storing the screening condition so as to acquire the screening condition. Every time the screening condition for screening the target room is formulated or selected by the configuration center, the screening condition of the target room formulated or selected this time will be saved, which may be saved in the database of the configuration center, for example, the Redis database corresponding to the configuration center, etc. After storing the formulated or selected screening condition for screening the target room through this step, when formulating or selecting the screening condition for screening the target room by the configuration center again, the same screening condition may be directly selected from the saved screening condition, without formulating again, etc. The screening condition that has been saved in the configuration center is used as an existing screening condition. When the operation is performed for the first time, if there are not certain screening conditions preset in the configuration center, the screening condition for screening the target room will be formulated according to service requirements, and there is no need to perform the selection of the screening condition for screening the target room from the configuration center. When certain screening conditions are preset in the configuration center, the screening condition for screening target room formulated or selected by the configuration center may be executed. When there is no required screening condition in the configuration center, the corresponding screening condition may be formulated by the configuration center; and when the configuration center comprises the required screening condition, the corresponding screening condition is selected from the configuration center.

The screening condition may comprise information related to the room, such as the number of persons in the room, time since the last broadcast, how many persons saw the broadcast, gender of the host in the room, start time, room type, room recommendation level, host id, host gender, etc. For example, the number of persons in the room may be greater than xx and less than xx, there are xx minutes from the last time the broadcast was received, the broadcast is controlled to be seen by about xx persons, etc., and the target room is screened according to these screening conditions.

In order to further optimize and explain the step, this specification further provides a method for formulating or selecting a screening condition for screening a target room by a configuration center, and as a preferred embodiment, the step comprises:

Comparing the formulated new screening condition with the existing screening condition in the configuration center, and judging whether the existing screening condition in the configuration center comprises the formulated new screening condition. A screening condition that is changed each time according to the service requirements is regarded as a formulated new screening condition, because there are certain screening conditions in the configuration center (when there is no preset screening condition in the configuration center, the existing screening condition in the configuration center is empty), the formulated new screening condition is compared with the existing screening condition in the configuration center to judge whether the existing screening condition in the configuration center comprises the formulated new screening condition. When certain screening conditions are preset in the configuration center, the formulated new screening condition will be compared with the preset screening condition in the configuration center; when there is no preset screening condition in the configuration center, the formulated new screening condition is compared with the preset screening condition in the configuration center as well, only that the preset screening condition in the configuration center is empty at this time.

When the existing screening condition in the configuration center comprises the formulated new screening condition, a screening condition that is the same as the formulated new screening condition in existing screening conditions in the configuration center is selected as a formulated new screening condition. Otherwise, a new screening condition is formulated in the configuration center. Some of the formulated new screening conditions may be the same as the existing screening conditions in the configuration center, that is, the existing screening conditions in the configuration center comprise some formulated new screening conditions, and other formulated new screening conditions do not exist in configuration center. In this case, it is only necessary to formulate the screening conditions that do not exist in the configuration center, without formulating all of them, and those screening conditions that exist in the configuration center may be directly selected.

For example, the service requirements require that the corresponding screening conditions are that: the number of persons in the room is greater than 10, and the time since the last broadcast was received is greater than 30 minutes, and the room that meets both of these two screening conditions is taken as the target room. These two screening conditions are first compared with the screening conditions in the configuration center. When the preset screening conditions in the configuration center comprise these two screening conditions, these two screening conditions are directly selected from the preset screening conditions in the configuration center. When the preset screening conditions in the configuration center do not comprise these two screening conditions, these two screening conditions need to be formulated by the configuration center, and then these two screening conditions are saved and are used as the existing screening conditions in the configuration center. When there is only one of the screening conditions in the configuration center, one screening condition comprised in the configuration center may be directly selected, and the other screening condition that is not comprised in the configuration center may be formulated by the configuration center and then saved. In addition, the number of screening conditions is not required and may be set according to the service requirements.

By formulating or selecting the screening condition for screening the target room in the configuration center, when changing the screening condition according to the service requirements, it is only necessary to formulate or select by the configuration center, without changing a large amount of other relevant configuration information in the system, which avoids the problems of heavy modification tasks and system instability caused by modifying a large amount of other relevant information of the system when modifying the screening condition in the prior art, thereby improving work efficiency and system stability.

Step S300: after formulating or selecting the screening condition by the configuration center, acquiring the screening condition formulated or selected by the configuration center. The screening condition may also be referred to as a filter, and the target room is screened according to the screening condition. The full-service broadcast server acquires the screening condition formulated or selected by the configuration center corresponding to the current service requirement, and replaces the screening condition corresponding to the last service or updates the screening condition corresponding to the last service.

The step comprises:

Acquiring the screening condition from an acquisition center to screen the target room according to the screening condition.

Acquiring unique identifiers (ID) of the online rooms. Each room has a unique ID corresponding thereto. Since the broadcast is only sent to the currently online room, it is the unique ID of the currently online room that is acquired.

Acquiring room information of the online room according to the acquired unique ID of the online room. The room information of the online room comprises information such as the number of persons in the room, broadcast time, room type, room recommendation level, host id, and host gender. Room information of the online room here does not comprise a unique ID thereof.

After acquiring the screening condition and the room information of the currently online room, the target room may be screened. According to the acquired screening condition and the room information of the online room, the target room is selected from the acquired online rooms, and a room that meets the screening condition is the target room.

Step S400: after acquiring the target room, sending the service request to the target room screened out, wherein, the target room receives the service request sent by the user in the current room, and displays it, so as to complete sending information in the live broadcast room.

The method according to the embodiment of this specification completes sending information in the live broadcast room, and overcomes the problems of complicated operations and poor system stability caused by a large number of changes to relevant configuration information when changing the screening condition in the prior art.

Figure 2:
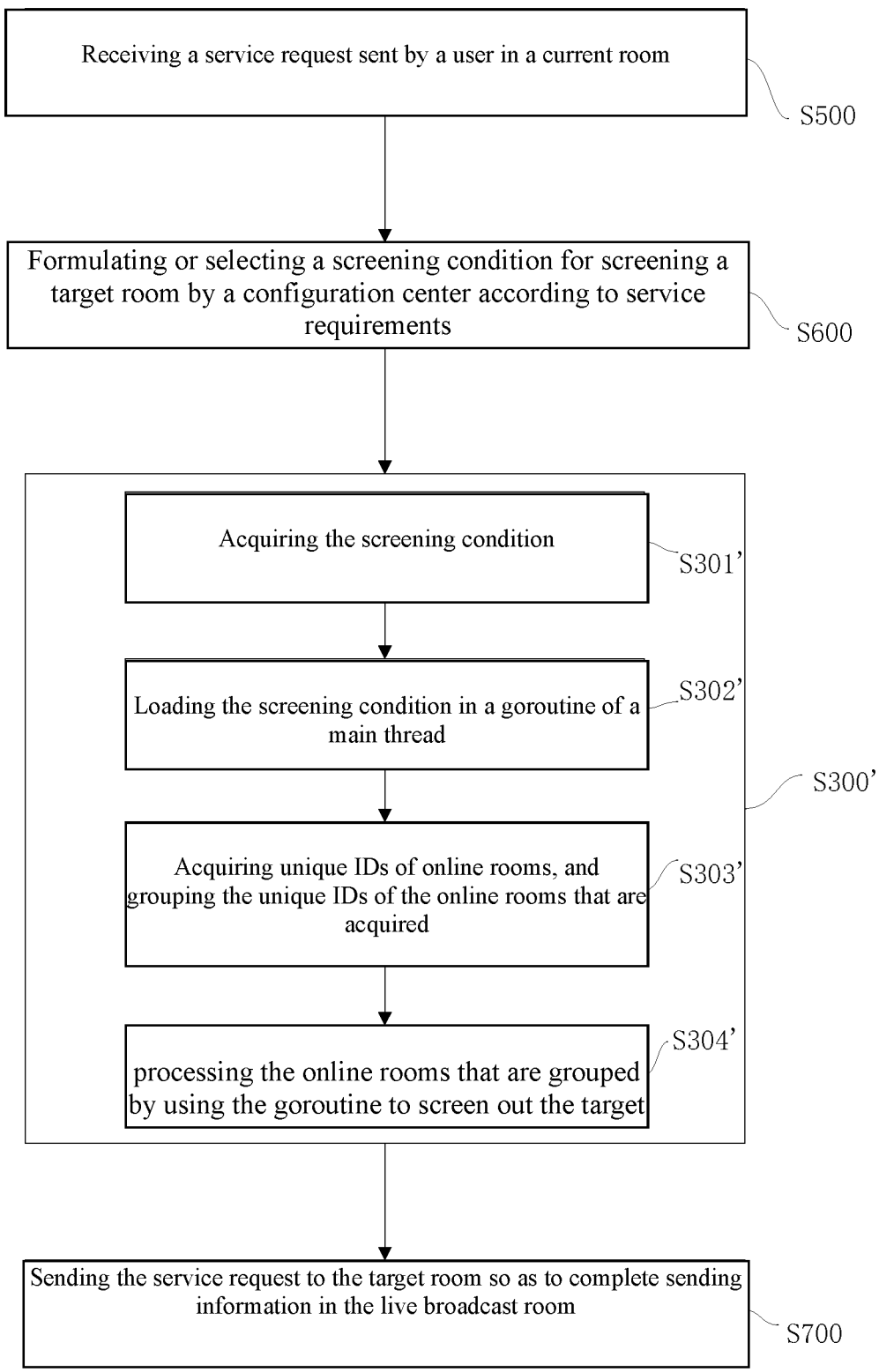
FIG. 2 is a schematic flow chart of another method for sending information in a live broadcast room provided by an embodiment of the present application.

As shown in FIG. 2, another embodiment of the method for sending information in a live broadcast room is shown, and this embodiment is a further optimization of the method for sending information in a live broadcast room shown in FIG. 1. The method provided by this embodiment has the same steps S100, S200, and S400 as the method shown in FIG. 1. These three steps are recorded as steps S500, S600, and S700 in this embodiment, and no details will be repeated here. A difference lies in step S300, which is denoted as step S300' in this embodiment, and this step is a further limitation or optimization of step S300. Step S300' comprises:

Step S301': acquiring the screening condition from the configuration center, so as to screen the target room according to the acquired screening condition.

Step S302': loading the screening condition in a goroutine of a main thread of the full-service broadcast server; wherein, the main thread Zhonghong Co., Ltd. comprises a plurality of threads, each goroutine operates independently; and the goroutine is lightweight thread implementation in the Go language, and may process a plurality of functions in parallel. Here, the goroutine acts as a carrier to execute the loaded screening condition.

Step S303': acquiring the unique ID of the online room, wherein, each room has a unique ID corresponding thereto; because the broadcast is only sent to the currently online room, so it is the unique ID of the currently online room that is acquired; and grouping the unique IDs of the online rooms that are acquired. Since there are more than one goroutine, the unique IDs of the online rooms are grouped; the group corresponds to the goroutine, each goroutine corresponds to a group; and goroutines are independent of each other. The method avoids the problem that when a same thread is used to process all online rooms synchronously, the processing cannot be continued if there are problems such as interruptions.

Step S304': processing the online rooms that are grouped by using the goroutine to screen out the target room. The step comprises:

By using goroutines in a plurality of main threads, according to the unique IDs of the online rooms in each group, acquiring room information of the online rooms in the group, that is, each goroutine acquires room information of an online room in a group corresponding thereto, and the room information of the online room comprises information such as the number of persons in the room, broadcast time, room type, room recommendation level, host id, and host gender. The room information of the online room here does not comprise the unique IDs thereof. The goroutines are in a one-to-one correspondence with groups of the unique identifiers of the online rooms, which may avoid the problem of errors in acquiring the room information (e.g., repeated acquisition, omission of acquisition, etc.).

By using each goroutine, screening out the target room from the online rooms in each group according to the screening condition loaded in the goroutine and the room information of the online rooms in each group that is acquired, so as to send a service request to the target room. Each goroutine screens the rooms in the group corresponding thereto, and the number of rooms screened by each goroutine is configurable.

In the prior art, after the full-service broadcast server acquires the online room, the main thread of the full-service broadcast server screens the room information of the currently online room according to the screening condition. Such a method is a synchronous method, that is, the online rooms are screened one by one, and after one room is screened, the next room is screened. If there is an interruption or a problem occurring in the screening process, rooms that have not been screened subsequently cannot be screened, and the screening process cannot continue, even rooms that meet the screening condition cannot be screened out to receive full-service broadcast. Through the method according to this embodiment, the online room group is screened by using the goroutine of the main thread of the full-service broadcast server; each goroutine screens the room of its corresponding group. When a certain goroutine has a problem and cannot continue to screen the room of its corresponding group, screening rooms of other groups by other goroutines will not be affected. This greatly reduces impact of the problems in the prior art.

Figure 3:
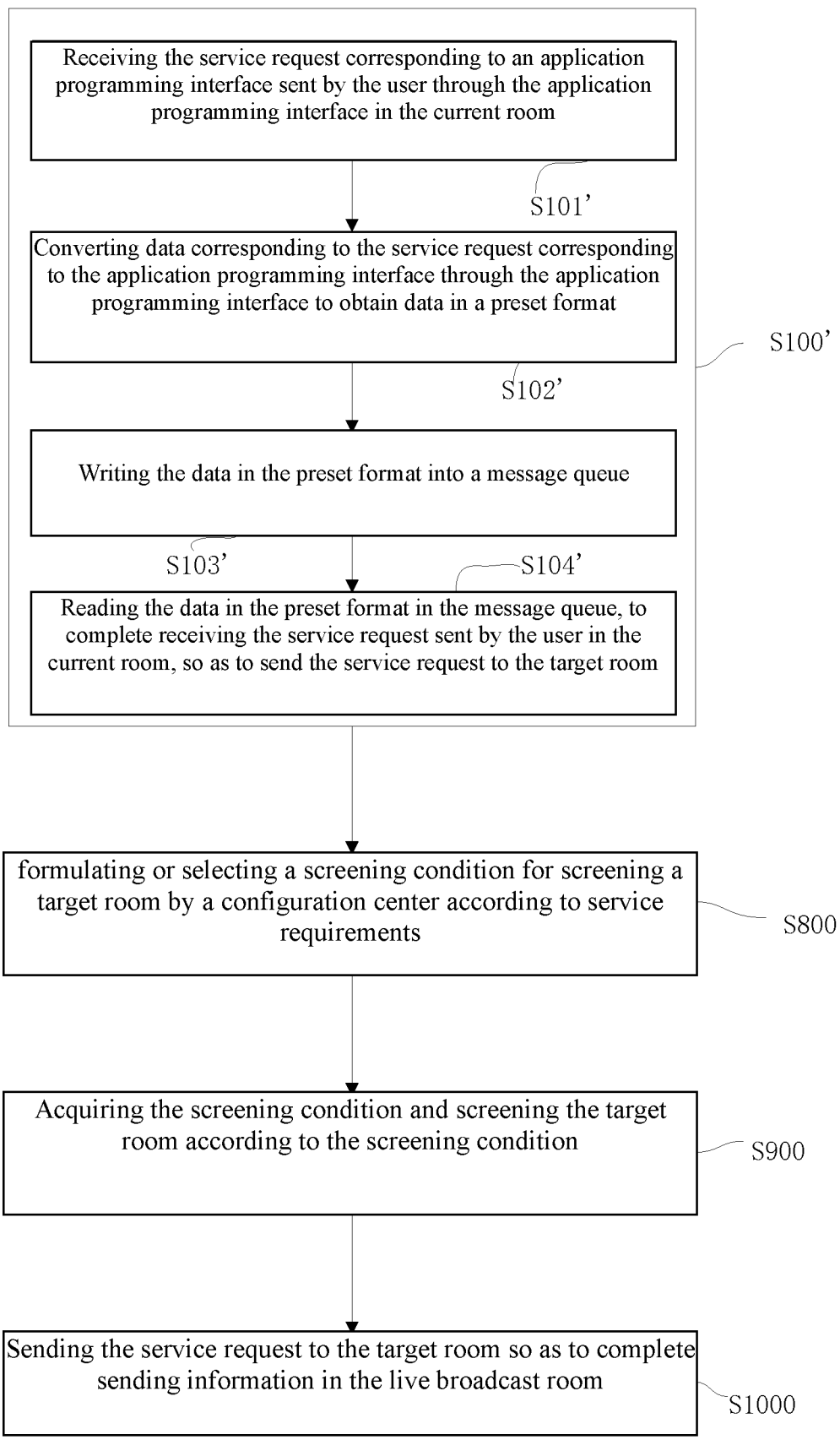
FIG. 3 is a schematic flow chart of another method for sending information in a live broadcast room provided by an embodiment of the present application.

As shown in FIG. 3, another embodiment of the method for sending information in a live broadcast room is shown. This embodiment is also an optimization of the method shown in FIG. 1. The method provided in this embodiment has the same steps S200, S300, and S400 as the method shown in FIG. 1, these three steps are recorded as steps S800, S900, and S1000 in this embodiment, and no details will not be repeated here. A difference lies in step S100, which is denoted as step S100' in this embodiment, and the step is a further limitation or optimization of step S100. Step S100' comprises:

Step S101': receiving the service request corresponding to an application programming interface sent by the user through the application programming interface in the current room. After the user sends the service request through the user client, the application program interface (API) corresponding to the service request in the current room receives the service request. Different application program interfaces may be written in different assembly languages, and each assembly language is incompatible. In the prior art, after the application programming interface in the current room sends the service request to the full-service broadcast server, the assembly language corresponding to the full-service broadcast server must be the same as the assembly language corresponding to the application programming interface, otherwise, the two are incompatible with each other and cannot function normally. When changing an application program interface corresponding to a certain service request, that is, when writing the application program interface in a different assembly language, it is necessary to use a script of the full-service broadcast server written in the assembly language corresponding to the application program interface after changing the assembly language, to receive the service request sent by the application program interface after changing the assembly language. Such situation in the prior art affects operation to a great extent and it needs to be written in different assembly languages.

Step S102': converting data corresponding to the service request corresponding to the application programming interface through the application programming interface to obtain data in a preset format. The application programming interface of the current room converts the data corresponding to the service request after receiving the service request, and converts the same into data in a unified data exchange format JOSN format. In this embodiment, the preset format is the JOSN format. Of course, other data exchange formats are also possible.

Step S103': after data format exchange is performed by the application programming interface on the data corresponding to the service request, writing the data in the preset format into a message queue, that is, writing the data in the data exchange format (e.g., JOSN format) into the message queue.

Step S104': after writing the data in the data exchange format corresponding to the service request into the message queue, reading the data in the preset format in the message queue, that is, reading the data in the data exchange format written in the message queue, to complete receiving the service request sent by the user in the current room, so as to execute the subsequent steps to send the service request to the target room. The message queue decouples the service request received by the application programming interface written in different languages. When reading the data in the message queue, only a full-service broadcast server written in one assembly language is required, and the assembly language corresponding to the full-service broadcast server does not need to be changed according to the assembly language corresponding to the application program interface. Thus, there is no need to change the assembly language and write the script of the full-service broadcast server again.

It is worth noting that, the embodiments corresponding to FIG. 1, FIG. 2 and FIG. 3 that may be combined together are also key embodiments, and also belong to the protection scope of the embodiments of this specification. The embodiments corresponding to FIG. 2 and FIG. 3 are replaced with the corresponding part of the embodiment corresponding to FIG. 1, which is the embodiment of the combination of the three. Since each part is described in detail in the above-described embodiment, no details will be repeated here.

Figure 4:
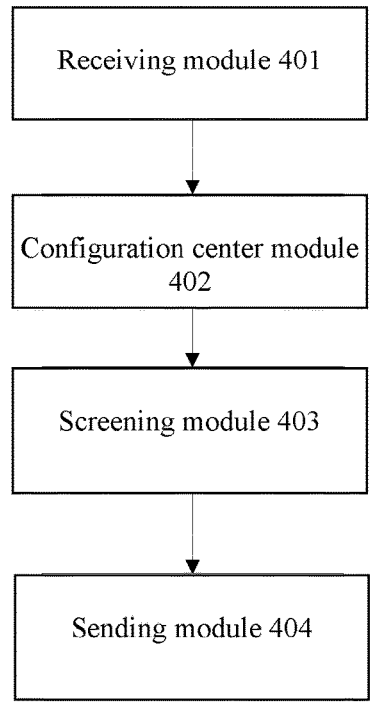
FIG. 4 is a structural schematic diagram of a method and an apparatus for sending information in a live broadcast room provided by an embodiment of the present application.

Corresponding to the above method embodiment, referring to FIG. 4, the embodiment of the present application further provides an apparatus 40 for sending information in a live broadcast room, comprising:

A receiving module 401, configured to receive the service request sent by the user in the current room.

A configuration center module 402, configured to formulate or select the screening condition for screening the target room by the configuration center according to the service requirement.

A screening module 403, configured to acquire a screening condition, and screen the target room according to the screening condition.

A sending module 404, configured to send the service request to the target room so as to complete sending information in a live broadcast room.

Optionally, after formulating or selecting the screening condition for screening the target room by the configuration center, the configuration center module 402 is further configured to: store the screening condition to acquire the screening condition.

Optionally, the configuration center module 402 is configured to: compare a formulated new screening condition with an existing screening condition in the configuration center, and judge whether the existing screening condition in the configuration center comprises the formulated new screening condition; in the case where the existing screening condition in the configuration center comprises the formulated new screening condition, select a screening condition that is same as the formulated new screening condition in the existing screening condition in the configuration center as the formulated new screening condition; otherwise, formulate the new screening condition in the configuration center.

Optionally, the screening module 403 is configured to: acquire the screening condition; acquire unique IDs of the online rooms; acquire room information of the online rooms according to the unique IDs of the online rooms; and according to the screening condition that is acquired and the room information of the online rooms, screen the target room from the online rooms that are acquired.

Optionally, the screening module 403 is configured to: acquire the screening condition; load the screening condition in a goroutine of a main thread; acquire unique IDs of online rooms, and group the unique IDs of the online rooms; and process the online rooms that are grouped by using the goroutine to screen out the target room.

Optionally, in the case where the screening module 403 processes the online rooms that are grouped by using the goroutines to screen out the target room, it is configured to: by using a plurality of goroutines, according to the unique IDs of the online rooms in each group, acquire room information of the online rooms in each group; the goroutines are in a one-to-one correspondence with groups of the unique identifiers of the online rooms; and by using the goroutine, screen out the target room from the online rooms in each group according to the screening condition loaded in the goroutine and the room information of the online rooms in each group that is acquired.

Optionally, the receiving module 401 is configured to: receive the service request corresponding to an application programming interface sent by the user through the application programming interface in the current room; convert data corresponding to the service request corresponding to the application programming interface through the application programming interface to obtain data in a preset format; write the data in the preset format into a message queue; and read the data in the preset format in the message queue, to complete receiving the service request sent by the user in the current room, so as to send the service request to the target room.

The apparatus shown in FIG. 4 may correspondingly execute the content in the above-described method embodiment. The parts not described in detail in this embodiment will not be repeated here with reference to the contents recorded in the above method embodiment.

Figure 5:
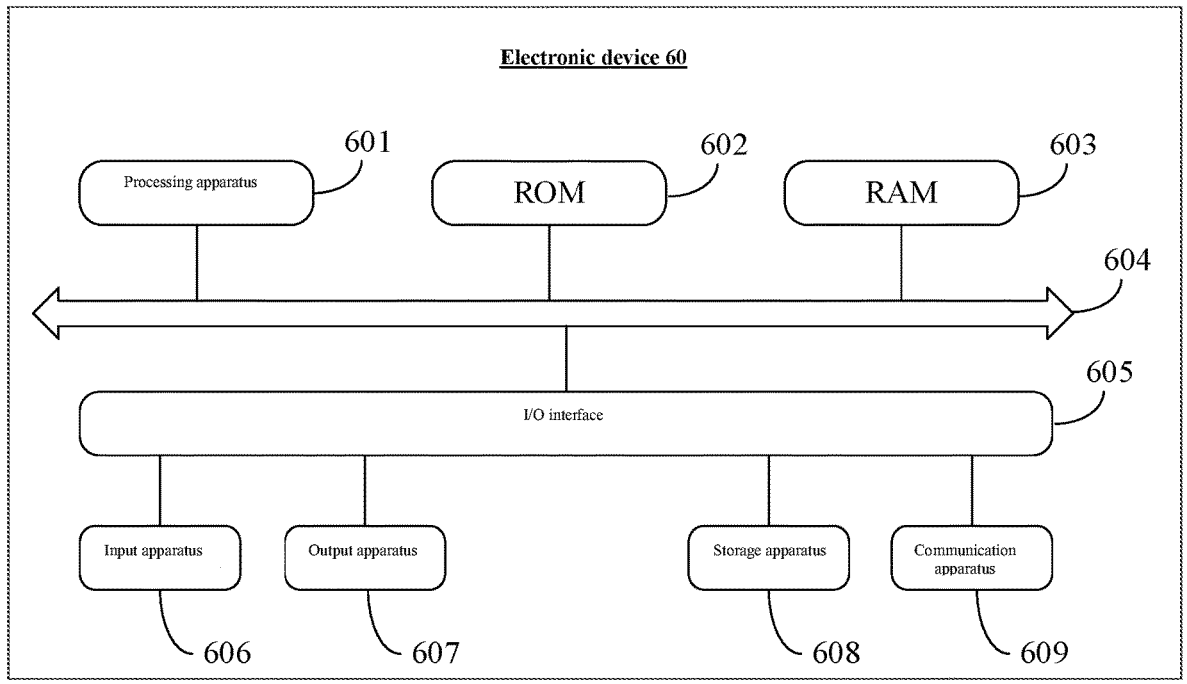
FIG. 5 is a schematic diagram of an electronic device provided by an embodiment of the present application.

Referring to FIG. 5, the embodiment of the present application further provides an electronic device 60, the electronic device comprises:

at least one processor; and a memory in communicative connection with the at least one processor; wherein, the memory stores instructions executable by the at least one processor, the instructions are executed by the at least one processor so that the at least one processor can execute the method for sending information in the live broadcast room according to the foregoing method embodiments.

An embodiment of the present application further provides a computer-readable storage medium, wherein, the computer-readable storage medium stores computer instructions, and the computer instructions are used to cause the computer to execute the method for sending information in the live broadcast room according to the foregoing embodiments.

An embodiment of the present application further provides a computer program product, wherein, the computer program product comprises a computer program stored on a computer-readable storage medium, the computer program comprises program instructions, and in the case where the program instructions are executed by a computer, the computer is caused to execute the method for sending information in a live broadcast room according to the foregoing method embodiments.

Referring next to FIG. 5, it shows a structural schematic diagram of an electronic device 60 suitable for implementing an embodiment of the present application. The electronic device according to the embodiment of the present application may comprise, but not limited to, a mobile terminal such as a mobile phone, a laptop, a digital broadcast receiver, a Personal Digital Assistant (PDA), a Portable Android Device (PAD), a Portable Multimedia Player (PMP), a vehicle-mounted terminal (e.g., a vehicle-mounted navigation terminal), etc., and a stationary terminal such as a digital TV, a desktop computer, etc. The electronic device shown in FIG. 5 is only an example, and should not impose any limitation on the function and use scope of the embodiments of the present application.

As shown in FIG. 5, the electronic device 60 may comprise a processing apparatus (e.g., a central processing unit, a graphics processor, etc.) 601, which may execute various appropriate actions and processing according to a program stored in a Read-Only Memory (ROM) 602 or a program loaded from a storage apparatus 608 into a Random Access Memory (RAM) 603. The RAM 603 further stores various programs and data required for operation of the electronic device 60. The processing apparatus 601, the ROM 602, and the RAM 603 are connected with each other through a bus 604. An input/output (I/O) interface 605 is also connected to the bus 604.

Usually, apparatuses below may be connected to the I/O interface 605: input apparatuses 606 comprising, for example, a touch screen, a touch pad, a keyboard, a mouse, an image sensor, a microphone, an accelerometer, a gyroscope, etc.; output apparatuses 707 comprising, for example, a Liquid Crystal Display (LCD), a speaker, a vibrator, etc.; a storage apparatus 608 comprising, for example, a magnetic tape, a hard disk, etc.; and a communication apparatus 609. The communication apparatus 609 may allow the electronic device 60 to perform wireless or wired communication with other device so as to exchange data. Although the diagram shows the electronic device 60 having various apparatuses, it should be understood that, it is not required to implement or have all the apparatuses shown, and the electronic device 60 may alternatively implement or have more or fewer apparatuses.

Particularly, according to some embodiments of the present application, the process described above with reference to the flow chart may be implemented as computer software programs. For example, the embodiments of the present application comprise a computer program product, which comprises a computer program carried on a computer-readable medium, and the computer program comprises program codes for executing the method shown in the flow chart. In such embodiments, the computer program may be downloaded and installed from the network via the communication apparatus 609, or installed from the storage apparatus 608, or installed from the ROM 602. When executed by the processing apparatus 601, the computer program executes the above-described functions limited in the methods according to the embodiments of the present application.

It should be noted that, in the present application, the above-described computer-readable medium may be a computer-readable signal medium or a computer-readable storage medium, or any combination of the above two. The computer-readable storage medium may be, for example, but not limited to, an electronic, magnetic, optical, electromagnetic, infrared, or semiconductor system, apparatus, or device, or any combination of the above. More specific examples of the computer-readable storage medium may comprise, but not limited to: an electrical connection having one or more conductors, a portable computer diskette, a hard disk, a Random Access Memory (RAM), a Read-Only Memory (ROM), an Erasable Programmable Read-Only Memory (EPROM or Flash memory), an optical fiber, a Portable Compact Disc Read-Only Memory (CD-ROM), an optical storage device, a magnetic storage device, or any suitable combination of the above. In the present application, a computer-readable storage medium may be any tangible medium that contains or stores a program that may be used by or in conjunction with an instruction executing system, an apparatus, or a device. Rather, in the present application, the computer-readable signal medium may comprise a data signal propagated in base band or as a portion of a carrier wave, which carries a computer-readable program code therein. Such propagated data signals may take a variety of forms, comprising but not limited to, electromagnetic signals, optical signals, or any suitable combination of the above. The computer-readable signal medium may also be any computer-readable medium other than a computer-readable storage medium, and the computer-readable signal medium may transmit, propagate, or transport programs for use by or in combination with the instruction executing system, the apparatus, or the device. The program codes embodied on the computer-readable medium may be transmitted by using any suitable medium, comprising but not limited to: electrical wire, optical cable, Radio Frequency (RF), etc., or any suitable combination of the above.

The above-described computer-readable medium may be comprised in the above-described electronic device; or may exist alone without being assembled into the electronic device.

The above-described computer-readable medium carries one or more programs, and when the above-described one or more programs are executed by the electronic device, the electronic device: acquires at least two internet protocol addresses; sends a node evaluation request comprising the at least two internet protocol addresses to a node evaluation device, wherein, the node evaluation device selects an internet protocol address from the at least two internet protocol addresses and returns the same; receives the internet protocol addresses returned by the node evaluation device; wherein, the acquired internet protocol address indicates an edge node in a content distribution network.

Alternatively, the above-described computer-readable medium carries one or more programs, and when the above-described one or more programs are executed by the electronic device, the electronic device: receives a node evaluation request comprising at least two internet protocol addresses; selects an internet protocol address from the at least two internet protocol addresses; returns the selected internet protocol addresses; wherein, the received internet protocol address indicates an edge node in a content distribution network.

The computer program codes for executing the operations according to the present application may be written in one or more programming languages or a combination thereof; the above-described programming languages comprise object-oriented programming languages such as Java, Smalltalk, C++, and also comprise conventional procedural programming languages such as "C" language or similar programming languages. The program codes may execute entirely on the user's computer, partly on the user's computer, as a stand-alone software package, partly on the user's computer and partly on a remote computer, or entirely on a remote computer or a server. In the case of a remote computer, the remote computer may be connected to the user's computer through any kind of network, comprising a Local Area Network (LAN) or a Wide Area Network (WAN), or may also be connected to an external computer (e.g., using an Internet Service Provider to connect via the Internet).

The flow chart and block diagrams in the accompanying drawings illustrate the architecture, functionality, and operation of possible implementations of systems, methods, and computer program products according to various embodiments of the present application. In this regard, each block in the flow chart or block diagrams may represent a module, a program segment, or a portion of codes, which comprise one or more executable instructions for implementing specified logical function(s). It should also be noted that, in some alternative implementations, the functions marked in the block may also occur in a different order from those marked in the accompanying drawings. For example, two blocks shown in succession may, in fact, be executed substantially concurrently, or the blocks may sometimes be executed in a reverse order, which depends upon the functionality involved. It should also be noted that, each block in the block diagrams and/or flow charts, and combinations of blocks in the block diagrams and/or flow charts, may be implemented by special purpose hardware-based systems that execute the specified functions or operations, or may also be implemented by a combination of special purpose hardware and computer instructions.

The units involved in the embodiments of the present application may be implemented by means of software, or may also be implemented by means of hardware. Wherein, names of these units do not constitute a limitation on the units per se in some cases, for example, the first acquisition unit may also be described as "a unit for acquiring at least two internet protocol addresses".

It should be understood that respective parts of the present application may be implemented by hardware, software, firmware, or a combination thereof.

The above are only specific embodiments of the present application, but the scope of the present application is not limited to this. Any variations or replacements that can be easily thought of by those skilled in the art within the technical scope disclosed in the present application shall be covered within the protection scope of the present application. Therefore, the protection scope of the present application shall be subject to the protection scope of the claims.

What is claimed is:

1. A method for sending information in a live broadcast room, comprising:
   receiving a service request sent by a user in a current room;
   formulating or selecting a screening condition for screening a target room by a configuration center according to service requirements, wherein the formulating or selecting a screening condition for screening a target room by a configuration center according to service requirements further comprises:
      determining whether at least one existing screening condition in the configuration center comprises a screen condition to be configured according to the service requirements based on comparing the screen condition to be figured with the at least one existing screening condition in the configuration center,
      in response to determining that the at least one existing screening condition in the configuration center comprises a screen condition that is the same as the screen condition to be configured, selecting the screening condition from the at least one existing screening condition in the configuration center as the screening condition for screening the target room, and
      in response to determining that the at least one existing screening condition in the configuration center does not comprise the screen condition, formulating a new screening condition by the configuration center as the screening condition for screening the target room;
   acquiring the screening condition and screening the target room according to the screening condition; and
   sending the service request to the target room so as to complete sending information in the live broadcast room.

2. The method according to claim 1, wherein after formulating or selecting the screening condition for screening the target room by the configuration center, the method further comprises:
   storing the screening condition for screening the target room.

3. The method according to claim 1, wherein acquiring the screening condition and screening the target room according to the screening condition comprises:
   acquiring the screening condition;
   acquiring unique identifiers of online rooms;
   acquiring room information of the online rooms according to the unique identifiers of the online rooms; and
   according to the screening condition that is acquired and the room information of the online rooms, screening the target room from the online rooms that are acquired.

4. The method according to claim 1, wherein acquiring the screening condition and screening the target room according to the screening condition comprises:
   acquiring the screening condition;
   loading the screening condition in a goroutine of a main thread;
   acquiring unique identifiers of online rooms, and grouping the unique identifiers of the online rooms; and
   processing the online rooms that are grouped by using the goroutine to screen out the target room.

5. The method according to claim 4, wherein processing the online rooms that are grouped by using the goroutine to screen out the target room comprises:
   by using a plurality of goroutines, according to the unique identifiers of the online rooms in each group, acquiring room information of the online rooms in the group, the goroutines being in a one-to-one correspondence with groups of the unique identifiers of the online rooms; and
   by using the goroutine, screening out the target room from the online rooms in each group according to the screening condition loaded in the goroutine and the room information of the online rooms in each group that is acquired.

6. The method according to claim 1, wherein receiving the service request sent by the user in the current room comprises:
   receiving the service request corresponding to an application programming interface sent by the user through the application programming interface in the current room;
   converting data corresponding to the service request corresponding to the application programming interface through the application programming interface to obtain data in a preset format;
   writing the data in the preset format into a message queue; and
   reading the data in the preset format in the message queue, to complete receiving the service request sent by the user in the current room, so as to send the service request to the target room.

7. An electronic device, comprising:
   at least one processor; and
   a memory in communicative connection with the at least one processor,
   wherein the memory stores instructions executable by the at least one processor, and the instructions, when executed by the at least one processor, cause the at least one processor to implement operations comprising:
   receiving a service request sent by a user in a current room;
   formulating or selecting a screening condition for screening a target room by a configuration center according to service requirements, wherein the formulating or selecting a screening condition for screening a target room by a configuration center according to service requirements further comprises:
      determining whether at least one existing screening condition in the configuration center comprises a screen condition to be configured according to the service requirements based on comparing the screen condition to be figured with the at least one existing screening condition in the configuration center,
      in response to determining that the at least one existing screening condition in the configuration center comprises a screen condition that is the same as the screen condition to be configured, selecting the screening condition from the at least one existing screening condition in the configuration center as the screening condition for screening the target room, and in response to determining that the at least one existing screening condition in the configuration center does not comprise the screen condition, formulating a new screening condition by the configuration center as the screening condition for screening the target room;

acquiring the screening condition and screening the target room according to the screening condition; and sending the service request to the target room to complete sending information in a live broadcast room.

8. The electronic device according to claim 7, the operations further comprising:

storing the screening condition for screening the target room.

9. The electronic device according to claim 7, wherein the acquiring the screening condition and screening the target room according to the screening condition comprises:

acquiring the screening condition;

acquiring unique identifiers of online rooms;

acquiring room information of the online rooms according to the unique identifiers of the online rooms; and according to the screening condition that is acquired and the room information of the online rooms, screening the target room from the online rooms that are acquired.

10. The electronic device according to claim 7, wherein the acquiring the screening condition and screening the target room according to the screening condition comprises:

acquiring the screening condition;

loading the screening condition in a goroutine of a main thread;

acquiring unique identifiers of online rooms, and grouping the unique identifiers of the online rooms; and processing the online rooms that are grouped by using the goroutine to screen out the target room.

11. The electronic device according to according to claim 10, wherein the processing the online rooms that are grouped by using the goroutine to screen out the target room comprises:

by using a plurality of goroutines, according to the unique identifiers of the online rooms in each group, acquiring room information of the online rooms in the group, the goroutines being in a one-to-one correspondence with groups of the unique identifiers of the online rooms; and by using the goroutine, screening out the target room from the online rooms in each group according to the screening condition loaded in the goroutine and the room information of the online rooms in each group that is acquired.

12. The electronic device according to claim 7, wherein the receiving a service request sent by a user in a current room comprises:

receiving the service request corresponding to an application programming interface sent by the user through the application programming interface in the current room;

converting data corresponding to the service request corresponding to the application programming interface through the application programming interface to obtain data in a preset format;

writing the data in the preset format into a message queue; and reading the data in the preset format in the message queue, to complete receiving the service request sent by the user in the current room, so as to send the service request to the target room.

13. A non-transitory computer-readable storage medium, wherein the computer-readable storage medium stores instructions, and the instructions, when executed by a computer, cause the computer to implement operations comprising:

receiving a service request sent by a user in a current room;

formulating or selecting a screening condition for screening a target room by a configuration center according to service requirements, wherein the formulating or selecting a screening condition for screening a target room by a configuration center according to service requirements further comprises:

determining whether at least one existing screening condition in the configuration center comprises a screen condition to be configured according to the service requirements based on comparing the screen condition to be figured with the at least one existing screening condition in the configuration center, in response to determining that the at least one existing screening condition in the configuration center comprises a screen condition that is the same as the screen condition to be configured, selecting the screening condition from the at least one existing screening condition in the configuration center as the screening condition for screening the target room, and in response to determining that the at least one existing screening condition in the configuration center does not comprise the screen condition, formulating a new screening condition by the configuration center as the screening condition for screening the target room;

acquiring the screening condition and screening the target room according to the screening condition; and sending the service request to the target room to complete sending information in a live broadcast room.

14. The non-transitory computer-readable storage medium according to claim 13, the operations further comprising:

storing the screening condition for screening the target room.

15. The non-transitory computer-readable storage medium according to claim 13, wherein the acquiring the screening condition and screening the target room according to the screening condition comprises:

acquiring the screening condition;

acquiring unique identifiers of online rooms;

acquiring room information of the online rooms according to the unique identifiers of the online rooms; and according to the screening condition that is acquired and the room information of the online rooms, screening the target room from the online rooms that are acquired.

16. The non-transitory computer-readable storage medium according to claim 13, wherein the acquiring the screening condition and screening the target room according to the screening condition comprises:

acquiring the screening condition;

loading the screening condition in a goroutine of a main thread;

acquiring unique identifiers of online rooms, and grouping the unique identifiers of the online rooms; and processing the online rooms that are grouped by using the goroutine to screen out the target room.

17. The electronic device according to according to claim 16, wherein the processing the online rooms that are grouped by using the goroutine to screen out the target room comprises:
by using a plurality of goroutines, according to the unique identifiers of the online rooms in each group, acquiring room information of the online rooms in the group, the goroutines being in a one-to-one correspondence with groups of the unique identifiers of the online rooms; and
by using the goroutine, screening out the target room from the online rooms in each group according to the screening condition loaded in the goroutine and the room information of the online rooms in each group that is acquired.

18. The non-transitory computer-readable storage medium according to claim 13, wherein the receiving a service request sent by a user in a current room comprises:
receiving the service request corresponding to an application programming interface sent by the user through the application programming interface in the current room;
converting data corresponding to the service request corresponding to the application programming interface through the application programming interface to obtain data in a preset format;
writing the data in the preset format into a message queue; and
reading the data in the preset format in the message queue, to complete receiving the service request sent by the user in the current room, so as to send the service request to the target room.

* * * * *